March 19, 1968        K. SENGEL        3,373,586

HELICAL SEAM PIPE MAKING MACHINE

Filed Oct. 14, 1963        4 Sheets-Sheet 1

INVENTOR
Kurt Sengel
By Dicke & Craig
ATTORNEYS

INVENTOR
Kurt Sengel
By Dicke & Craig
ATTORNEYS

March 19, 1968

K. SENGEL 3,373,586

HELICAL SEAM PIPE MAKING MACHINE

Filed Oct. 14, 1963

INVENTOR
Kurt Sengel
By Dicke & Craig
ATTORNEYS

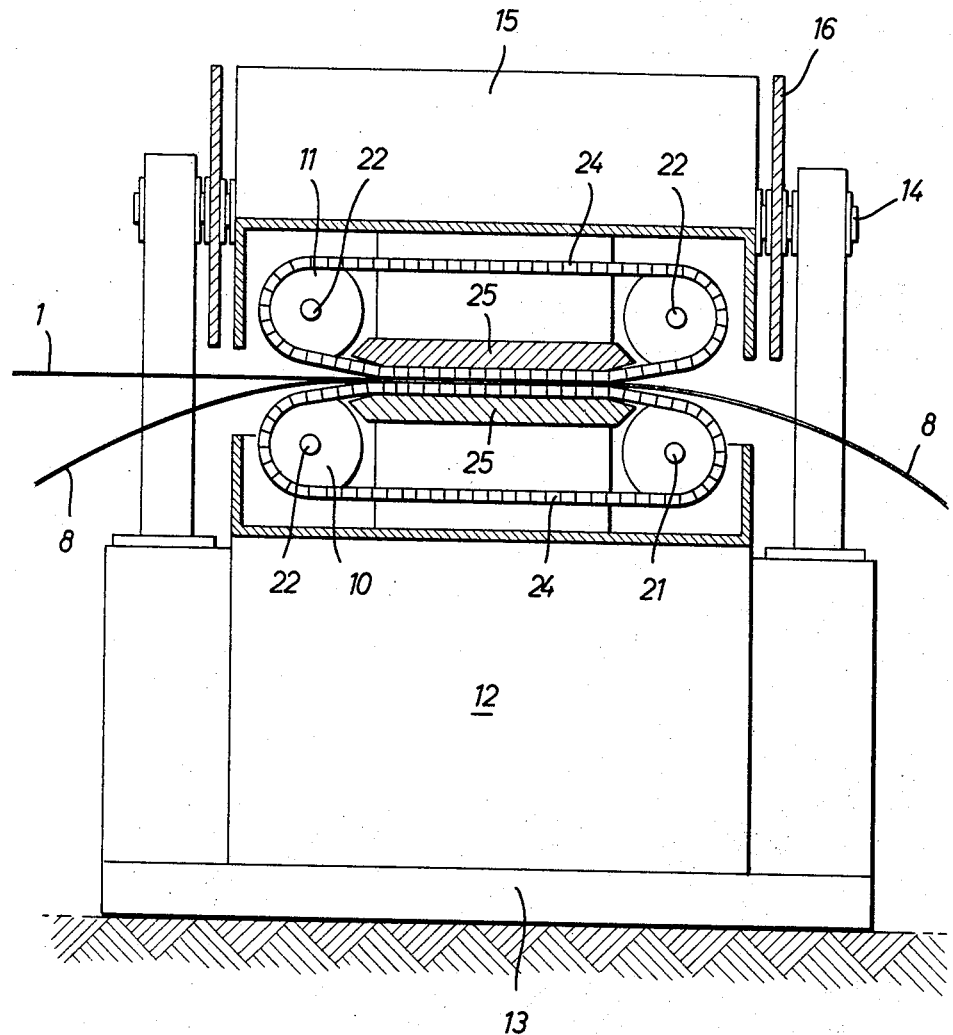

United States Patent Office 3,373,586
Patented Mar. 19, 1968

3,373,586
HELICAL SEAM PIPE MAKING MACHINE
Kurt Sengel, Friedrichshafen, Germany, assignor to Driam A.G., Zurich, Switzerland
Filed Oct. 14, 1963, Ser. No. 316,082
Claims priority, application Germany, Oct. 17, 1962, D 40,084
10 Claims. (Cl. 72—135)

The present invention relates to a machine for producing a welded helical seam pipe of a relatively large diameter of flat metal strip stock.

For producing a pipe of the above-mentioned type, the strip stock is generally forced into a forming tool by means of a feeding mechanism which acts upon the strip stock while it is still flat. This forming tool either consists of a shell-shaped element or of cylindrical rollers or of a combination of rollers with stationary tool parts. For forming a metal strip into a helical seam pipe it is necessary to mount the forming tool so that its axis extends at an oblique angle to the axis of the metal strip in accordance with the forming angle α. The helical seam is then closed by welding the abutting edges of the metal strip to each other by means of a welding mechanism of a type which depends upon the particular operating conditions.

The position of the welding point may be varied within certain relatively narrow limits depending upon the particular design of the pipe making machine. One critical limit defining the position of the welding point is the first point of contact between the first edge of the metal strip which is still straight and the second edge which has already been formed so as to complete one turn. It is however advisable to shift the welding point so as to be located slightly behind this first point of contact, as seen in the direction of movement of the metal strip, so that the second edge of the strip which is already completely formed may be welded together with a preformed or completely formed first edge. In all cases, the cooling weld moves along a helical line and is subjected to pressure, thrust, and bending stresses since the edge portions of the metal strip can in this area be supported only from one side, if at all. These unavoidable stresses upon the cooling weld constitute a source of considerable danger of leading to defects in the finally welded seam.

When forming the metal strip into a helical seam pipe, usually a considerable sliding and rolling friction occurs between the strip surfaces and a certain part of the forming tool. This requires an increase in driving power and results in additional wear upon the forming tool as well as in the danger that the outer surface of the pipe will be scarred or damaged.

Finally, it is unavoidable in the helical seam pipe making machines of the known types that the volume of the forming tool increases approximately in the third power of the pipe diameter, which means that the required forming tool for producing pipes of a large diameter constitutes a very expensive structure.

It is an object of the present invention to provide a mechanism which substantially overcomes the above-mentioned disadvantages which occur especially in the production of helical seam pipes of a large diameter and a small wall thickness.

According to the invention, this object is attained by providing the driving means in the form of a drive which consists of two inter-connected groups of endless jointed tracks which lie substantially within a common arcuate plane or a common straight plane. The two groups of tracks are laterally spaced from each other and one of these groups forming the main drive grips the plane metal strip along its entire width as it enters between the associated tracks of this group and it is driven in accordance with the desired welding speed. The second part of the drive forming the secondary drive generally runs synchronously with the main drive and grips the second turn of the helical seam pipe, but preferably only along a part of its width. The required contact pressure between the associated jointed tracks is produced in a conventional manner, for example, by hydraulic means and preferably only one of the two endless jointed systems engaging with one or the other side of the strip is positively driven.

The two endless jointed systems engaging with the opposite sides of the metal strip are arranged so that one of them is located at, and engages upon, the inside and the other upon the outside of the pipe to be made. By this arrangement the metal strip is not subjected to any compression stresses in the longitudinal direction and any buckling thereof is therefore absolutely prevented. Consequently, the guide channel through which the metal strip had to be pressed in the known helical seam pipe making machines is no longer required.

The pipe making machine according to the invention does not require or possess an actual forming tool separate from the drives, but if the contact surfaces of the endless jointed tracks are plane, the metal strip is formed into a helical seam pipe by bending the first turn freely as may be desired. If the contact surfaces of the tracks are curved, the forming of the strip occurs between these tracks, that is either partly or completely to the final desired radius of curvature. This not only saves the considerable expense of forming tools for producing pipes of different diameters, but also avoids almost entirely the friction between the metal strip and the forming tool which is otherwise unavoidable. The power required for operating the pipe making machine according to the invention is considerably lower than the power which was previously required and the wear upon the different parts of the forming tool which was previously unavoidable is also avoided. Furthermore, the danger that the outer surfaces of the pipe might be scarred or damaged is completely eliminated.

Naturally, it is necessary to provide an auxiliary appliance for feeding a new metal strip into the machine and for permitting the first complete turn of the strip to be formed until the same is welded or tacked to the beginning of the second turn. This auxiliary appliance may be a simple guide rail with a drag chain, a bending roll, or any other suitable device which is no longer required and may be removed after the first turn has been completed.

It is further obvious that the pipe after being welded and while the production continues has to be supported by suitable means, for example, by a roller bed.

Since in the production of pipes of a large diameter and a relatively small wall thickness direct measurements of the pipe diameter are too complicated, the diameter of the pipe is preferably checked by measuring its circumference.

The two groups of endless jointed tracks of the drive mechanism, i.e., the main drive and the secondary drive are generally driven synchronously. It is, however, advisable to insert a differential gear between these two drives which may be driven by an auxiliary drive, to effect a relative displacement between the two groups of endless jointed tracks for adjusting the diameter or circumference of the pipe.

An important advantage of the machine according to the invention is the fact that by means of the two endless jointed track systems and the two groups of tracks in each system it is now possible to feed and guide the metal strip so that its adjacent edges which are to be welded together will run for a certain distance exactly equally and synchronously. This synchronous guiding movement may either occur in a straight direction or along a helical line which, however, does not necessarily have to have a radius of curvature coinciding with the radius of the pipe to be produced. The synchronous guiding movement in a straight direction has, however, certain advantages, and the following statements therefore apply primarily to this case. If in a machine according to the invention the welding is carried out at a point near the beginning of the synchronous guiding means, i.e., the two groups of tracks, the solidification and cooling of the weld within these guiding means occurs entirely without tensions. Even after the strip leaves these synchronous guiding means, the forming occurs purely as a bending action without any harmful transverse and tangential stresses. Due to this fact it is possible to attain a welding seam of a perfect quality more easily and reliably than this has been possible with the helical seam pipe making machines of the known types.

The particular features of the machine according to the invention permit any desired welding method to be employed which is the most suitable for the particular kind and thickness of material of which the pipe is made and the rate of production to be achieved. They also permit the employment of auxiliary means for the welding operation. Thus, for example, for arc welding, it is easily possible to provide a suitable welding support, while for resistance welding there is adequate space to provide, for example, roller electrodes or high-frequency contacts.

The various features and advantages of the present invention will become more clearly apparent from the following detailed description thereof which is to be read with reference to the accompanying diagrammatic drawings, in which—

FIGURE 4 shows a cross section which is taken in the direction of feed of the strip stock and illustrates the two endless jointed track systems in which the tracks are guided so that their associated contact surfaces extend along a straight plane; while

Figure 1:
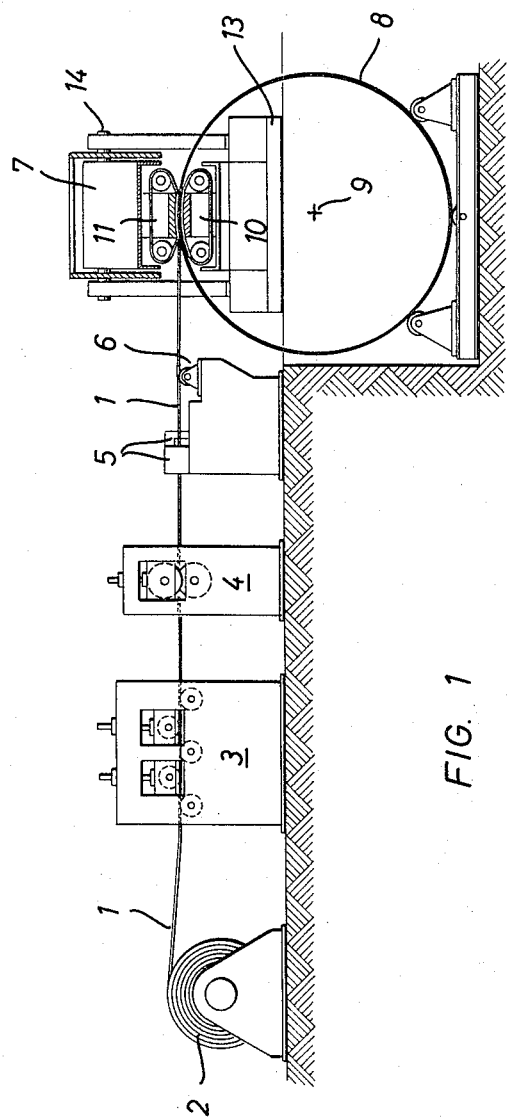
FIGURE 1 shows a side view of the general layout of a helical seam pipe making machine according to the invention.
Figure 2:
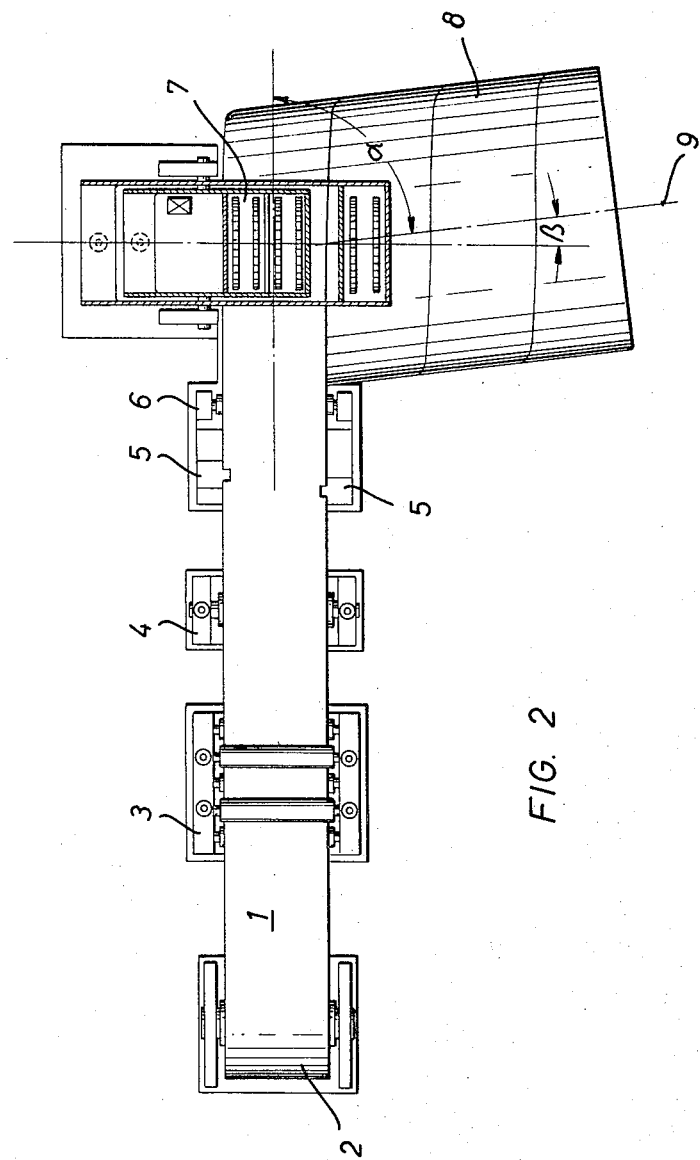
FIGURE 2 shows a plan view thereof.
Figure 3:
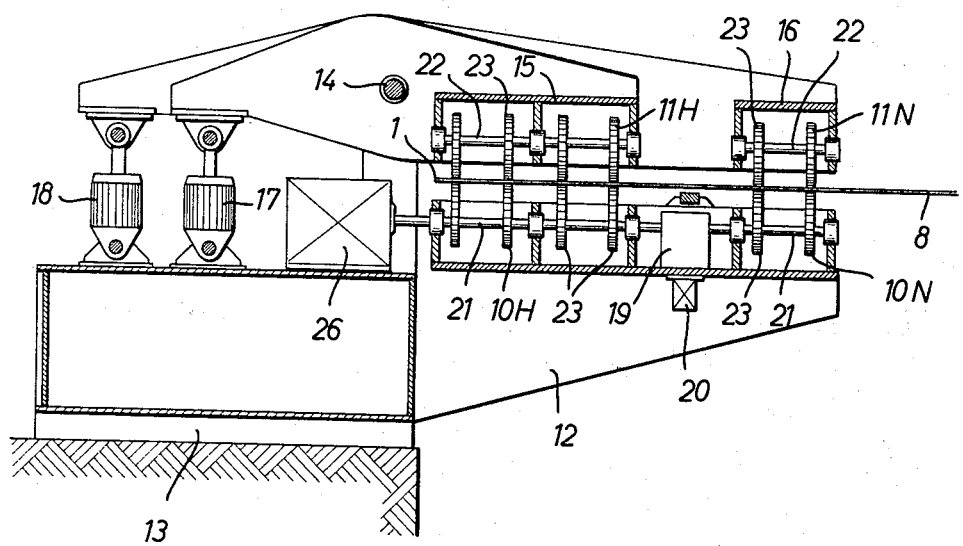
FIGURE 3 shows a cross section of the endless jointed track drives which is taken in a direction transverse to the direction of feed of the strip stock.
Figure 5:
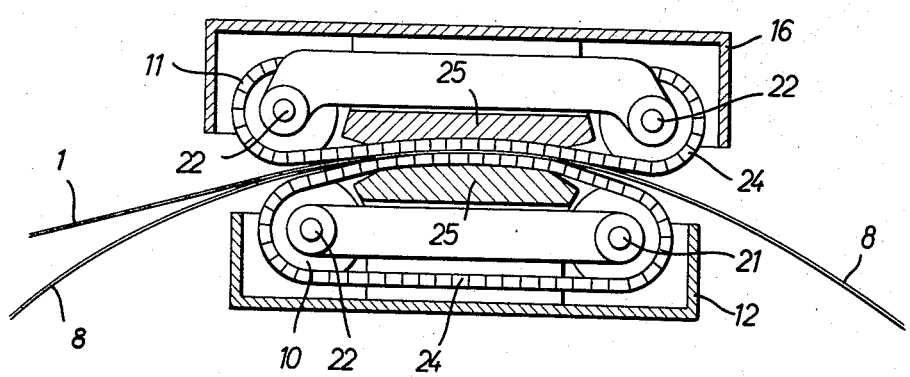
FIGURE 5 shows a view similar to FIGURE 4 in which, however, the associated contact surfaces of the tracks extend along an arcuate plane.

As illustrated particularly in FIGURES 1 and 2 of the drawings, the method of producing helical seam pipe in accordance with the invention consists in winding a metal strip 1 off a supply reel 2, drawing it through a series of auxiliary mechanisms such as, for example, a straightening machine 3, an edge-trimming machine 4, and a marking device 5, guiding it vertically and horizontally by guide elements 6, and then passing it into the driving and forming mechanism 7 according to the invention in which the strip 1 is formed into a helical seam pipe 8 and the helical seam thereof is welded. The axis 9 of the helical seam pipe 8 is inclined at an angle $\beta$ to the axis of the driving and forming mechanism 7. As illustrated in FIGURES 3 to 5, this mechanism 7 generally consists of a pair of operatively associated endless jointed track systems 10 and 11. The track system 10 is located at the inside of the pipe 8 to be made and is mounted on a solid bracket 12 which is rigidly secured to and projects from a strong base 13. The second track system 11 acts upon the metal strip 1 at the outer side of the pipe and is mounted, for example, on a pair of strong levers 15 and 16 which are pivotable about the axis of a shaft 14 by hydraulic cylinders 17 and 18 or equivalent means to exert the necessary contact pressure between the two systems 10 and 11 and the metal strip 1 for driving the latter.

For driving the tracks of the two systems, generally only one of these systems has to be positively driven by a drive mechanism 26, preferably the system 10 which is mounted on the stationary bracket 12, whereas the tracks of the second system 11 may be driven merely by the contact pressure between the tracks of the two systems 10 and 11 and the strip 1.

The positively driven endless jointed track system 10 comprises the main drive 10H which according to FIGURES 2 and 3 may consist, for example, of four jointed tracks and secondary drive 10N which may consist, for example, of two jointed tracks. The main drive 10H and the secondary drive 10N are separated by a differential gear 19 which, by means of an auxiliary drive 20, may temporarily impart to the secondary drive 10N an additional movement relative to the constantly driven main drive 10H for the purpose of adjusting the diameter of the pipe to be produced. When the auxiliary drive 20 is stopped, the two drives 10H and 10N run synchronously.

Each system 10 and 11 consists of rotatably mounted driving and driven shafts 21 and 22 and sprocket wheels 23 secured to these shafts which drive the tracks 24. Each track 24 is composed of a plurality of chain links and designed to transmit the longitudinal driving forces as well as the transverse forces with which these links are pressed against the metal strip 1. Each link or at least each second link is preferably provided with a friction coating which engages upon the metal strip 1 and with rollers, not shown, which roll along pressure plates 25. These pressure plates 25 are rigidly mounted on the bracket 12 and the levers 15 and 16, respectively, and their shape determines the shape of the contact surfaces of the tracks. The contact surfaces of the two associated jointed track systems 10 and 11 may thus be either plane as illustrated in FIGURE 4 or arcuate as illustrated in FIGURE 5. Minor adjustments of the levers 15 and 16 relative to each other, for example, for compensating for the different thicknesses of different metal strips 1 may be effected by adjustments of the pivot 14.

Although the invention has been illustrated and described with reference to the preferred embodiments thereof, it should be understood that it is in no way limited to the details of such embodiments, but is capable of numerous modifications within the scope of the appended claims. Thus, for example, the position of the two jointed track systems 10 and 11 as shown in FIGURE 3 may also be reversed so that the rigid bracket 12 with the drive shaft 21 will be located at the outside and the pivotable levers 15 and 16 at the inner side of the pipe to be produced. Furthermore, if desired, the jointed track system 11 on the lever 15 may also be driven positively, although this would complicate the construction of the entire pipe making machine considerably. The two edges of the metal strip may also be shifted relative to each other by any other suitable arrangement of the differential gear 19 or by any other suitable means.

Having thus fully disclosed my invention, what I claim is:

1. A machine for producing welded helical seam pipe comprising two operatively associated endless jointed track systems each having at least one endless jointed track disposed opposite to the track of the other system, said two tracks adapted to grip between them and to feed a metal strip passing from a supply toward and between said tracks and also to grip and feed a part of said strip previously passed between and beyond said tracks and then bent to form a complete turn of the pipe to be produced, and means for driving said tracks so that the adjacent edges of two adjacent parts of said pipe will run synchronously with each other to permit them to be welded together.

2. A machine for producing welded helical seam pipe comprising two operatively associated endless jointed track systems, each of said systems comprising at least two endless jointed tracks laterally spaced from each other and disposed opposite to the tracks of the other system so as to form at least two pairs of tracks, the first of said pairs adapted to grip between them and to feed a metal strip passing from a supply toward and between said first pair, and the second pair of tracks adapted to grip between them and to feed a part of said strip previously passed between and beyond said first pair and then bent to form a complete turn of the pipe to be produced, and means for driving the tracks of both pairs so as to run synchronously with each other so that the adjacent edges of two adjacent parts of said pipe will also run synchronously to permit them to be welded together.

3. A machine for producing welded helical seam pipe comprising two operatively associated endless jointed track systems, each of said systems comprising at least two endless jointed tracks laterally spaced from each other and disposed opposite to the tracks of the other system so as to form at least two pairs of tracks, the first of said pairs adapted to grip between them and to feed a metal strip passing from a supply toward and between said first pair and also to curve the same to an extent so as at least to assist in bending said strip to form a complete turn of the pipe to be produced, and the second pair of tracks adapted to grip the inner and outer sides of a part of the adjacent turn previously formed, and means for driving the tracks of both pairs so as to run synchronously with each other so that the adjacent edges of two adjacent parts of said pipe will also run synchronously to permit them to be welded together.

4. A machine for producing welded helical seam pipe comprising two operatively associated endless jointed track systems, each of said systems comprising at least two endless jointed tracks laterally spaced from each other and disposed opposite to the tracks of the other system so as to form at least two pairs of tracks, the first of said pairs adapted to grip between them and to feed a metal strip passing from a supply toward and between said first pair, and the second pair of tracks adapted to grip between them and to feed a part of said strip previously passed between and beyond said first pair and then bent to form a complete turn of the pipe to be produced, means for pressing said tracks against the opposite sides of said strip, means for guiding said tracks so that at least the contact surfaces thereof engaging with said strip are maintained substantially within the same straight plane, and means for driving the tracks of both pairs so as to run synchronously with each other so that the adjacent edges of two adjacent parts of said pipe will also run synchronously to permit them to be welded together.

5. A machine for producing welded helical seam pipe comprising two operatively associated endless jointed track systems, each of said systems comprising at least two endless jointed tracks laterally spaced from each other and disposed opposite to the tracks of the other system so as to form at least two pairs of tracks, the first of said pairs adapted to grip between them and to feed a metal strip passing from a supply toward and between said first pair, and the second pair of tracks adapted to grip between them and to feed a part of said strip previously passed between and beyond said first pair and then bent to form a complete turn of the pipe to be produced, means for pressing said tracks against the opposite sides of said strip, means for guiding said tracks so that at least the contact surfaces thereof engaging with said strip are arcuately curved at a radius larger than the radius of curvature of the helical seam pipe to be produced, and means for driving the tracks of both pairs so as to run synchronously with each other so that the adjacent edges of two adjacent parts of said pipe will also run synchronously to permit them to be welded together.

6. A machine for producing welded helical seam pipe comprising two operatively associated endless jointed track systems, each of said systems comprising at least two endless jointed tracks laterally spaced from each other and disposed opposite to the tracks of the other system so as to form at least two pairs of tracks, the first of said pairs adapted to grip between them and to feed a metal strip passing from a supply toward and between said first pair, and the second pair of tracks adapted to grip between them and to feed a part of said strip previously passed between and beyond said first pair and then bent to form a complete turn of the pipe to be produced, means for pressing said tracks against the opposite sides of said strip, means for guiding said tracks so that at least the contact surfaces thereof engaging with said strip are arcuately curved substantially in accordance with the radius of curvature of the pipe to be produced, and means for driving the tracks of both pairs so as to run synchronously with each other so that the adjacent edges of two adjacent parts of said pipe will also run synchronously to permit them to be welded together.

7. A machine for producing welded helical seam pipe comprising two operatively associated endless jointed track systems, each of said systems comprising at least two endless jointed tracks laterally spaced from each other and disposed opposite to the tracks of the other system so as to form at least two pairs of tracks, the first of said pairs adapted to grip between them and to feed a metal strip passing from a supply toward and between said first pair, and the second pair of tracks adapted to grip between them and to feed a part of said strip previously passed between and beyond said first pair and then bent to form a complete turn of the pipe to be produced, means for pressing said tracks against the opposite sides of said strip, and means for positively driving the tracks of both pairs of only one of said systems so as to run synchronously with each other so that the adjacent edges of two adjacent parts of said pipe will also run synchronously to permit them to be welded together, the tracks of both pairs of the other system being taken along by the contact pressure and friction between the tracks of both systems and said strip.

8. A machine for producing welded helical seam pipe comprising two operatively associated endless jointed track systems, each of said systems comprising at least two endless jointed tracks laterally spaced from each other and disposed opposite to the tracks of the other system so as to form at least two pairs of tracks, the first of said pairs adapted to grip between them and to feed a metal strip passing from a supply toward and between said first pair, and the second pair of tracks adapted to grip between them and to feed a part of said strip previously passed between and beyond said first pair and then bent to form a complete turn of the pipe to be produced, means for pressing said tracks against the opposite sides of said strip, means for positively driving the tracks of both pairs of only one of said systems so as normally to run synchronously with each other so that the adjacent edges of two adjacent parts of said pipe will also run synchronously to permit them to be welded together, the tracks of both pairs of the other system being taken along by the contact pressure and friction between the tracks of both systems and said strip, and auxiliary drive means for turning said positively driven tracks relative to each other for adjusting the diameter of said pipe.

9. A machine as defined in claim 2, further comprising a rigid base, a rigid bracket mounted on and projecting laterally from said base, one of said endless jointed tracks systems mounted on said bracket, at least one two-armed lever pivotably mounted on said base and carrying the other endless jointed tracks system on one of its arms, and means for applying pressure upon the other arm of said lever to press the tracks of said other endless jointed tracks system toward the corresponding tracks of said first system.

10. A machine for producing welded helical seam pipe comprising two operatively associated endless jointed track systems, each of said systems comprising two groups of endless jointed tracks, said two groups of each system being laterally spaced from each other and disposed opposite to the tracks of the two groups of the other system, the first of said groups of both systems adapted to grip between them and to feed a metal strip passing from a supply toward and between the tracks of said first group, and the second group adapted to grip between them and to feed a part of said strip previously passed between and beyond said first group and then bent to form a complete turn of the pipe to be produced, a rigid base, a rigid bracket mounted on and projecting laterally from said base, one of said endless jointed track systems including both groups of tracks thereof mounted on said bracket a plurality of two-armed levers pivotably mounted on said base and each carrying on one arm at least one of the tracks of the two groups of the other system, means for applying pressure upon the other arm of each lever to press the tracks of said other system toward the corresponding tracks of said first system, and means for driving the tracks of both groups of at least one system so as to run synchronously with each other so that the adjacent edges of two adjacent parts of said pipe will also run synchronously to permit them to be welded together.

References Cited
UNITED STATES PATENTS

| | | | |
|---|---|---|---|
| 414,524 | 11/1889 | Green | 228—15 |
| 1,939,581 | 12/1933 | Tesmer | 228—15 |
| 3,127,500 | 3/1964 | Morris | 219—59 |
| 3,145,758 | 8/1964 | Sprung et al. | 72—135 |

RICHARD J. HERBST, *Primary Examiner.*